(12) United States Patent
Chassignet (10) Patent No.: US 10,850,456 B2
(45) Date of Patent: Dec. 1, 2020

(54) METHOD OF FABRICATING AN AIRFOIL ELEMENT OUT OF COMPOSITE MATERIAL AND HAVING METAL REINFORCEMENT FASTENED BY RIVETING

(71) Applicant: SAFRAN AIRCRAFT ENGINES, Paris (FR)

(72) Inventor: Eric Lucien Chassignet, Montereau sur le Jard (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 11 days.

(21) Appl. No.: 15/820,686

(22) Filed: Nov. 22, 2017

(65) Prior Publication Data

US 2018/0147797 A1    May 31, 2018

(30) Foreign Application Priority Data

Nov. 25, 2016 (FR) ...................................... 16 61524

(51) Int. Cl.
*B29D 99/00* (2010.01)
*B29C 70/54* (2006.01)
(Continued)

(52) U.S. Cl.
CPC ............. *B29C 70/545* (2013.01); *B21J 15/02* (2013.01); *B29C 33/0033* (2013.01);
(Continued)

(58) Field of Classification Search
CPC ....... B29C 70/545; B29C 70/24; B29C 70/48; B29C 70/543; B29L 2031/082;
(Continued)

(56) References Cited

U.S. PATENT DOCUMENTS 5,246,520 A * 9/1993 Scanlon ................ B29C 70/504
156/245
5,252,279 A * 10/1993 Gore ..................... B29C 70/545
264/154

(Continued)

FOREIGN PATENT DOCUMENTS

DE  10 2011 054 168 A1  4/2013
WO  WO 2010/061140 A1  6/2010

OTHER PUBLICATIONS

French Preliminary Search Report dated Jul. 28, 2017 in French Application 16 61524 filed on Nov. 25, 2016 (with English Translation of Categories of Cited Documents).

*Primary Examiner* — Jason L Vaughan
*Assistant Examiner* — Amanda Kreiling
(74) *Attorney, Agent, or Firm* — Oblon, McClelland, Maier & Neustadt, L.L.P.

(57) ABSTRACT

A method of fabricating an airfoil element out of composite material, comprises:
 making a fiber preform (300), said preform being impregnated with resin;
 polymerizing the resin with a matrix so as to obtain an airfoil element made of composite material comprising fiber reinforcement densified by a matrix; and
 fastening metal reinforcement on the composite material airfoil element, the metal reinforcement being fastened on the airfoil element by rivets.

The method further comprises, prior to impregnating the fiber preform (300) with resin, inserting spacer elements (10) between the fibers of the fiber preform (300) and removing said spacer elements after the resin has been polymerized so as to form at least one passage between the fibers of the fiber reinforcement of the composite material airfoil element.

13 Claims, 9 Drawing Sheets

(51) Int. Cl.
| | |
|---|---|
| *B29C 70/24* | (2006.01) |
| *B21J 15/02* | (2006.01) |
| *B29C 33/00* | (2006.01) |
| *F01D 5/28* | (2006.01) |
| *F04D 29/02* | (2006.01) |
| *B29L 31/08* | (2006.01) |
| *B29C 70/48* | (2006.01) |
| *B29K 63/00* | (2006.01) |

(52) U.S. Cl.
CPC ............ *B29C 70/24* (2013.01); *B29C 70/543* (2013.01); *B29D 99/0025* (2013.01); *F01D 5/282* (2013.01); *F01D 5/286* (2013.01); *F04D 29/023* (2013.01); *B29C 70/48* (2013.01); *B29K 2063/00* (2013.01); *B29L 2031/08* (2013.01); *B29L 2031/082* (2013.01); *F05D 2220/32* (2013.01); *F05D 2220/36* (2013.01); *F05D 2230/50* (2013.01); *F05D 2300/6034* (2013.01)

(58) Field of Classification Search
CPC ........... B29L 2031/08; Y10T 29/49336; Y10T 29/49337; Y10T 29/49339; Y10T 29/49341; Y10T 29/49343
See application file for complete search history.

(56) References Cited

U.S. PATENT DOCUMENTS

| | | | | |
|---|---|---|---|---|
| 2010/0133381 A1* | 6/2010 | Klaukien | ................ | B64C 1/064 244/119 |
| 2011/0311368 A1* | 12/2011 | Coupe | ................... | B29C 70/222 416/241 A |

* cited by examiner

METHOD OF FABRICATING AN AIRFOIL ELEMENT OUT OF COMPOSITE MATERIAL AND HAVING METAL REINFORCEMENT FASTENED BY RIVETING

BACKGROUND OF THE INVENTION

The invention relates to airfoil elements of a turbine engine, in particular blades, made of composite material comprising fiber reinforcement densified with a matrix, the matrix being obtained by injecting a liquid composition containing a precursor for the matrix into a fiber preform.

The intended field is that gas turbine blades for aeroengines or industrial turbines, and more particularly but not exclusively, for fan blades of aeroengines.

The fabrication of an airfoil element out of composite material comprises the following steps:

a) making a fiber structure by three-dimensional or multilayer weaving;

b) compacting and shaping the fiber structure;

c) placing the fiber preform as obtained in this way in tooling for resin transfer molding (RTM);

d) injecting a liquid composition that is a precursor of a matrix material, such as a resin, into the fiber preform; and e) transforming the liquid composition into a matrix so as to obtain an airfoil element made out of composite material that comprises fiber reinforcement densified by a matrix.

By way of example, for an aeroengine fan blade, it is necessary to fasten metal reinforcement on the leading edge of the blade in order to protect the blade against impacts from external elements (e.g. birds). The metal reinforcement is fastened to the leading edge of the blade by adhesive. Adhesively fastening metal reinforcement on the leading edge is an operation that can be found to be difficult. The quality of the adhesive bond determines the ability of the metal reinforcement to remain on the blade.

Another solution consists in fastening the metal reinforcement to the blade by means of rivets. Under such circumstances, the blade of composite material and the metal reinforcement are drilled so as to form therein passages for the fastener rivets. Nevertheless, drilling the blade of composite material leads to cutting the fibers of the fiber reinforcement of the blade, and that can affect the mechanical properties of the resulting blade.

Also known are Documents US 2010/0133381 and DE 10 2011 054 168, both of which describe methods of fabricating an element out of composite material that comprises fiber reinforcement that has been drilled. In those documents, a spacer element is inserted in the fiber preform after said preform has been impregnated, in order to drill a hole through said preform without damaging the fibers of the preform.

Nevertheless, the solutions described in Documents US 2010/0133381 and DE 10 2011 054 168 are not satisfactory for fastening reinforcement on the element made of composite material with fiber reinforcement that has been drilled in this way.

OBJECT AND SUMMARY OF THE INVENTION

Consequently, the present invention seeks to propose a solution enabling metal reinforcement to be fastened in reliable manner on an airfoil element made of composite material and to do so without harming the mechanical properties of the composite material constituting the blade.

The present invention also seeks to propose a solution that not only does not spoil the mechanical properties of the composite material constituting the element but also enables metal reinforcement to be fastened in satisfactory manner on the element.

The present invention also seeks to find a solution that is easy to implement.

To this end, the invention provides in particular a method of fabricating an airfoil element out of composite material, the method comprising:

making a fiber preform, said preform being impregnated with resin;

polymerizing the resin with a matrix so as to obtain an airfoil element made of composite material comprising fiber reinforcement densified by a matrix; and fastening metal reinforcement on the composite material airfoil element, the metal reinforcement being fastened on the airfoil element by rivets;

the method being characterized in that it further comprises, prior to impregnating the fiber preform with resin, inserting at least one spacer element between the fibers of the fiber preform and removing the spacer element after the resin has been polymerized so as to form at least one passage between the fibers of the fiber reinforcement of the composite material airfoil element.

This produces an airfoil element made of composite material with passages for rivets without any need to drill holes in the element. Since the spacer elements are inserted between the fibers, the fibers are not broken and the resulting airfoil element made of composite material presents good mechanical properties, even in the zones that include rivets.

Furthermore, the spacer element is inserted in the fiber preform prior to impregnating said fiber preform with resin.

Such a characteristic makes it possible to avoid moving resin while inserting the spacer element, and thus makes it possible to obtain an element that possesses a surface that is plane, without any swelling, on which it is easy to fasten the metal reinforcement. Specifically, the movement of resin while inserting the spacer element gives rise to a swelling around the hole formed by the spacer element, as is described in particular in document DE 10 2011 054 168.

Furthermore, inserting the spacer element in the fiber preform is easier when said insertion is performed prior to impregnating said fiber preform.

In an embodiment of the invention, at least one insert corresponding to the dimensions of a passage for the shank of a rivet is inserted between the fibers of the fiber preform, the insert being removed or eliminated after the resin has been polymerized in order to form a passage suitable for receiving the shank of a rivet in the composite material airfoil element.

In an aspect of this embodiment, each insert is removed from the composite material airfoil element by mechanical means.

In another embodiment of the invention, prior to polymerizing the resin, a fiber texture that is to form the fiber preform is placed in the mold cavity of shaping tooling, said cavity including at least one tooth or spike serving to form at least one passage between the yarns of the fiber texture, the fiber preform being maintained in the mold cavity during polymerization of the resin.

According to another particular characteristic of the invention, the fiber preform is obtained from a fiber texture made by three-dimensional or multilayer weaving, the preform subsequently being impregnated with a resin.

The airfoil element made of composite material may in particular correspond to a turbine engine blade, and more particularly to a fan blade of an aeroengine.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The invention applies in general manner to making airfoil elements out of composite material, in particular to making blades, the airfoil elements being made from a fiber preform into which a liquid composition that is a precursor of a matrix material is injected and then transformed so as to obtain a part comprising fiber reinforcement densified by a matrix, with metal reinforcement also being fastened on the airfoil element by rivets.

The fabrication method in accordance with the invention is described with respect to fabricating a turbine engine blade. The method of the invention for fabricating a composite material blade with metal reinforcement begins by making a fiber blank that is obtained by three-dimensional weaving or by multilayer weaving.

The term "three-dimensional weaving" or "3D weaving" is used herein to mean a method of weaving in which at least some of the warp yarns interlink weft yarns over a plurality of weft layers, e.g. such as an "interlock weave". The term "interlock weave" is used herein to mean a 3D weave in which each warp layer interlinks a plurality of weft layers with all of the yarns in a given warp column having the same movement in the weave plane.

The term "multilayer weaving" is used herein to mean 3D weaving with a plurality of weft layers in which the basic weave of each layer is equivalent to a conventional 2D fabric weave, such as a weave of plain, satin, or twill type, but in which certain points of the weave serve to interlink weft layers.

Making the fiber structure by 3D or multilayer weaving serves to obtain linking between the layers and thus to have good mechanical strength for the fiber structure and for the resulting composite material part, and to do so in a single textile operation.

After densification, it may be advantageous to promote obtaining a surface state that is free from significant irregularities, i.e. having a good finish state in order to avoid or limit finishing operations by machining or to avoid forming resin pockets when the composite has a resin matrix. For this purpose, in a fiber structure having an internal portion or core, and an outer portion or skin adjacent to the outside surface of the fiber structure, the skin is preferably made by weaving with a plain, satin, or twill type weave in order to limit surface irregularities, with a satin type weave also producing a surface of smooth appearance.

It is also possible to vary the three-dimensional weave in the core portion, e.g. by combining different interlock weaves, or an interlock weave with a multilayer weave, or indeed different multilayer weaves. It is also possible to vary the weave in the skin over the outside surface.

There follows a description of an embodiment of a fiber structure in accordance with the invention. In this embodiment, the weaving is performed on a Jacquard type loom.

Figure 1:
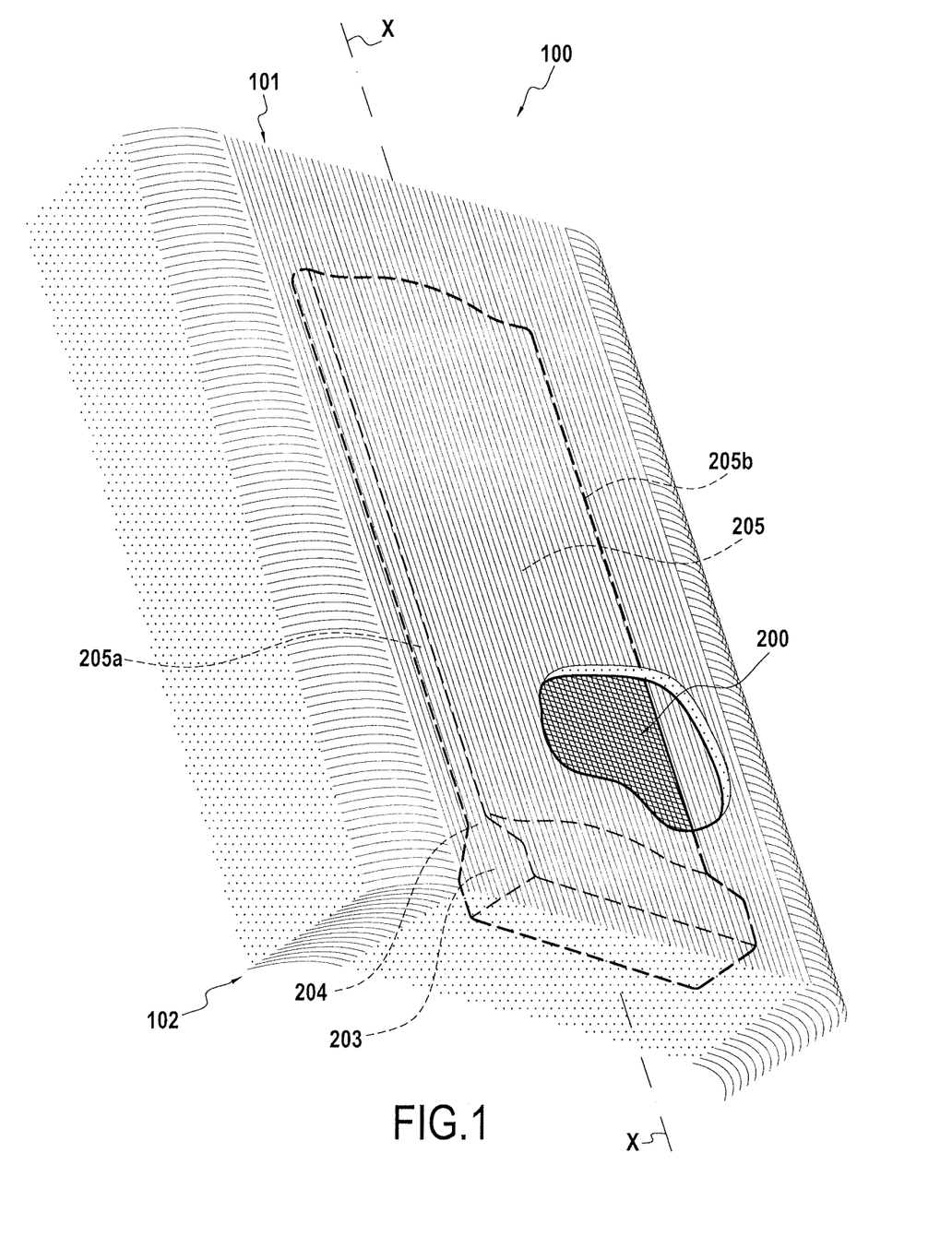
FIG. 1 is a highly diagrammatic view of a three-dimensionally woven fiber blank for making a fiber structure in accordance with an embodiment of the invention.

FIG. 1 is a highly diagrammatic view showing the weaving of a fiber blank 100 from which it is possible to extract a fiber structure 200 (FIG. 2) that makes it possible, after compacting and shaping, to obtain a fiber reinforcing preform for an aeroengine blade.

The fiber blank 100 is obtained by three-dimensional weaving, or 3D weaving, or by multilayer weaving that is performed in known manner using a Jacquard type loom having a bundle of warp yarns or strands 101 arranged in a plurality of layers, the warp yarns being interlinked by weft layers 102 that are likewise arranged in a plurality of layers, some of the weft layers including braids as explained in detail below. A detailed example of making a fiber preform that is to form the fiber reinforcement of an aeroengine blade from a 3D woven fiber blank is described in detail in particular in the following documents: U.S. Pat. Nos. 7,101,154, 7,241,112, and WO 2010/061140.

The fiber blank 100 is woven in the form of a strip extending generally in a direction X corresponding to the longitudinal direction of the blade that is to be made. In the fiber blank 100, the fiber structure 200 presents varying thickness that is determined as a function of the longitudinal thickness and of the profile of the airfoil of the blade that is to be made. In its portion that is to form a root preform, the fiber structure 200 presents a portion 203 of greater thickness that is determined as a function of the thickness of the blade root that is to be made. The fiber structure 200 is extended by a portion 204 of decreasing thickness that is to form the blade tang, and then by a portion 205 that is to form the airfoil of the blade. The portion 205 presents a profile in a direction that is perpendicular to the direction X that varies between its edge 205a that is to form the leading edge of the blade and its edge 205b that is to form the trailing edge of the blade that is to be made. The portion 205 has first and second faces 205c and 205d extending between the edges 205a and 205b (FIG. 2) that are to form the pressure side face and the suction side face, or vice versa, of the blade airfoil.

The fiber structure 200 is woven as a single piece and after non-woven yarns have been sheared off the blank 100, it needs to present the almost final shape and dimensions of the blade, i.e. a "net shape". To this end, in the portions of the fiber structure that are of varying thickness, such as in the portion 204 of decreasing thickness, the reduction in the thickness of the preform is obtained by progressively removing weft layers during weaving.

Figure 2:
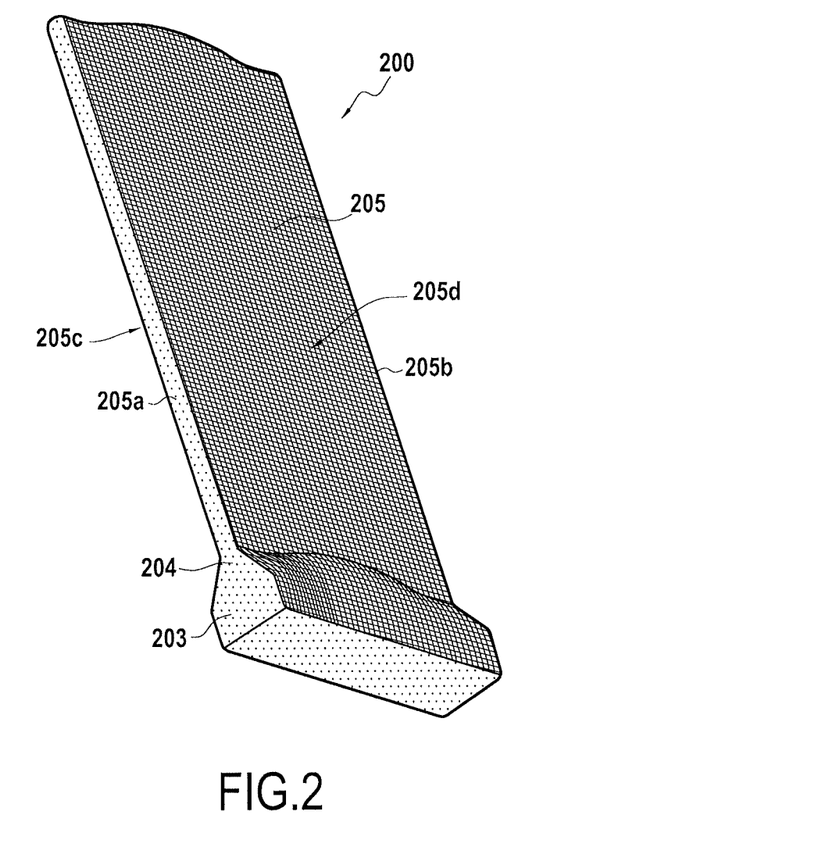
FIG. 2 is a diagrammatic view of a fiber structure obtained from the FIG. 1 fiber blank.

Once the weaving of the fiber structure 200 in the blank 100 has been completed, non-woven yarns are sheared off. This produces the fiber structure 200 as shown in FIG. 2, which structure is woven as a single piece and includes the inserts 10.

Figure 3:
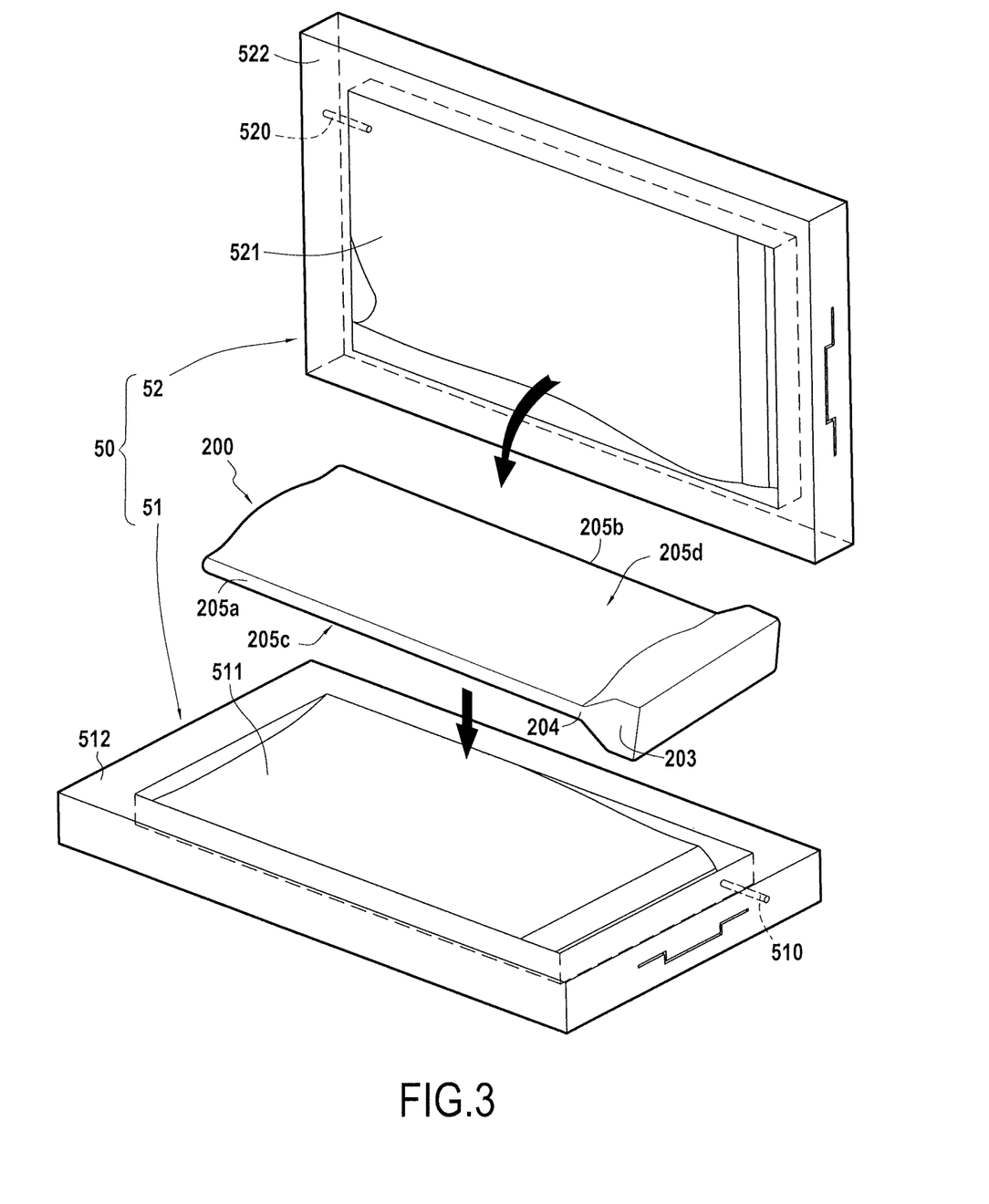
FIG. 3 is an exploded diagrammatic perspective view showing shaping tooling and how the FIG. 2 fiber structure is placed inside it.

The following step consists in compacting and shaping the fiber structure 200 to form a fiber preform ready for densifying. To this end, the fiber structure is placed in shaping tooling 50 (FIG. 3). The tooling 50 comprises a first shell 51 having a first cavity 511 in its center corresponding to part of the shape and the dimensions of the blade that is to be made, the cavity 511 being surrounded by a first contact plane 512. The first shell 51 also has an injection port 510 for enabling a matrix-precursor liquid composition to be injected into the fiber preform. The tooling 50 also has a second shell 50 that includes in its center a second cavity 521 corresponding to part of the shape and dimensions of the blade that is to be made, the second cavity 521 being surrounded by a second contact plane 522 that is to co-operate with the first contact plane 512 of the first shell 51. The second shell also includes a discharge port 520 for co-operating with a pumping system.

The first and second shells may be made in particular out of a metal material such as aluminum, for example, or else out of graphite.

Figure 4:
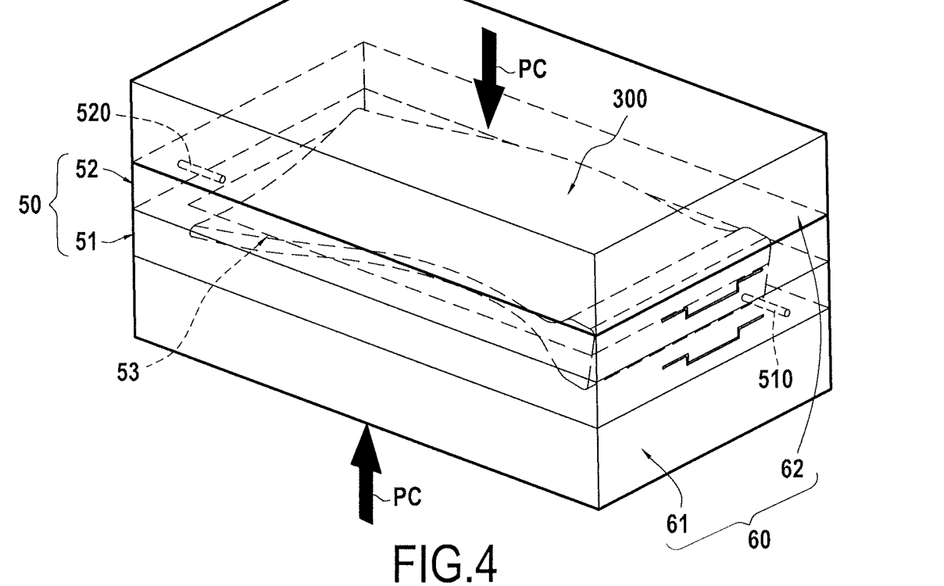
FIG. 4 is a diagrammatic perspective view showing the shaping tooling of FIG. 3 placed in compacting and shaping tooling and showing how a compacting and shaping operation is performed in order to obtain a fiber preform.

The fiber structure 200 is initially positioned in the cavity 511 of the first shell 51, with the second shell 52 then being placed on the first shell 51 so as to close the shaping tooling 50. Once the tooling 50 is closed, as shown in FIG. 4, the first and second shells are in an "assembly" position, i.e. a position in which the first and second cavities 511 and 521 are placed facing each other, while the first and second contact planes 512 and 522 also face each other. In this configuration, the first and second cavities 511 and 521 together define an inside volume 53 having the shape of the blade that is to be made and in which the fiber structure 200 is placed. In the presently-described example, the cavity 511 is to form the pressure side of the blade fiber preform, while the cavity 521 is to form the suction side of the blade preform.

Figure 5:
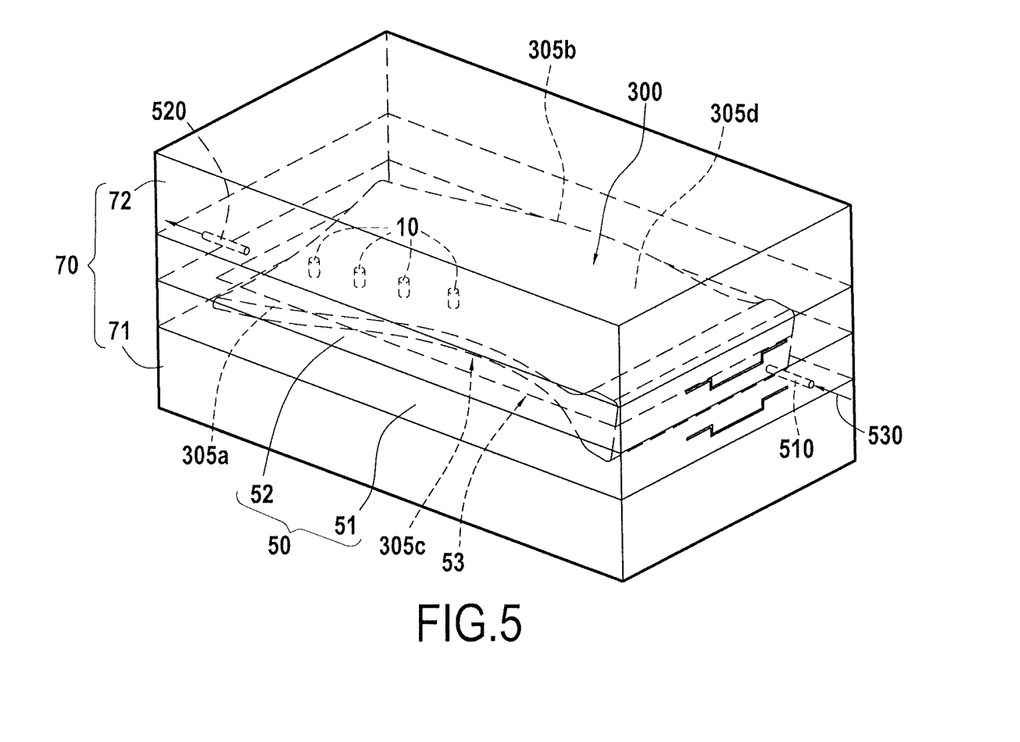
FIG. 5 is a diagrammatic perspective view showing the shaping tooling placed in injection tooling and how an operation of injecting a matrix-precursor liquid composition is injected into the fiber preform in order to obtain a composite material blade.

The tooling 50 with the fiber structure inside it is placed in compacting and forming tooling 60 (FIG. 4). The tooling 60 has a bottom portion 61 on which the first shell 51 of the tooling 50 rests, and a top portion 62 placed on the second shell 52 of the tooling 50. The compacting and forming tooling 60 is subjected to the application of compacting pressure PC, which may be applied for example by placing the tool 60 in a press (not shown in FIG. 4). The application of pressure PC leads to the first and second shells 51 and 52 moving towards each other until the first and second contact planes 512 and 522 meet, thereby serving both to compact the fiber structure 200 with a determined compaction ratio and serving to obtain a likewise determined fiber density, and to shape the fiber structure to match the profile of the blade that is to be fabricated. A preform 300 is thus obtained that presents the shape of the blade that is to be made (FIG. 5). The preform 300 presents a profile of varying thickness between its edge 305a that is to form the leading edge of the blade and its edge 305b that is to form the trailing edge of the blade that is to be made. The preform 300 has first and second faces 305c and 305d extending between the edges 305a and 305b and serving to form the pressure side and suction side faces of the airfoil of the blade, or vice versa.

In accordance with an embodiment of the invention, one or more inserts, in this example a plurality of inserts 10, are inserted between the fibers of the fiber preform 300 in a zone present in the vicinity of the edge 305a that is to form the leading edge of the blade. Each insert passes through the preform in its thickness direction, i.e. from the face 305c to the face 305d (FIG. 5). Each insert 10 is introduced into the fiber preform 300 so as to be inserted between the weft and warp yarns or strands. This creates a through passage between the fibers that can be maintained until the end of fabricating the composite material blade, i.e. until after the fiber preform has been densified, as explained below. A passage made in this way does not break the fibers of the warp or weft yarns.

Each insert 10 presents dimensions similar to the dimensions of the shank of the rivet that is to be inserted into the passage that is formed after the insert has been removed.

In FIG. 5, the tooling 50 is placed between a bottom portion 71 and a top portion 72 of injection tooling 70. The bottom portion 71 and the top portion 72 of the tooling 70 are provided with heater means (not shown in FIG. 5). Once the tooling 70 is closed, the blade is then molded by impregnating the preform 300 with a thermosetting resin that is polymerized by heat treatment. For this purpose, use is made of the well-known resin transfer molding (RTM) method. In the RTM method, a resin 530, e.g. a thermosetting resin, is injected via the injection port 510 of the first shell 51 into the inside space 53 defined between the two cavities 511 and 521 and occupied by the preform 300. The port 520 of the second shell 52 is connected to a discharge duct maintained under pressure (not shown in FIG. 5). This configuration makes it possible to set up a pressure gradient between the bottom portion of the preform 300 into which the resin is injected and the top portion of the preform situated close to the port 520. In this way, the resin 530 injected substantially level with the bottom portion of the preform impregnates all of the preform progressively by flowing through it until it reaches the discharge port 520 through which surplus resin is discharged. Naturally, the first and second shells 51 and 52 of the tooling 50 may respectively have a plurality of injection ports and a plurality of discharge ports.

By way of example, the resin used may be an epoxy resin of temperature class 180° C. (the maximum temperature it can withstand without losing characteristics). Resins suitable for RTM methods are well known. They preferably have low viscosity in order to facilitate injection between the fibers. The choice of the temperature class and/or of the chemical nature of the resin is determined as a function of the thermomechanical stresses to which the part is to be subjected. Once the resin has been injected throughout the reinforcement, it is polymerized by heat treatment in the RTM method.

After injection and polymerization, the blade is unmolded. It may optionally be subjected to a post-baking cycle in order to improve its thermomechanical characteristics (increasing its glass transition temperature). In the end, the blade is trimmed to remove excess resin and chamfers are machined. No other machining is needed since, given that the part is molded, it complies with the required dimensions.

Figure 6:
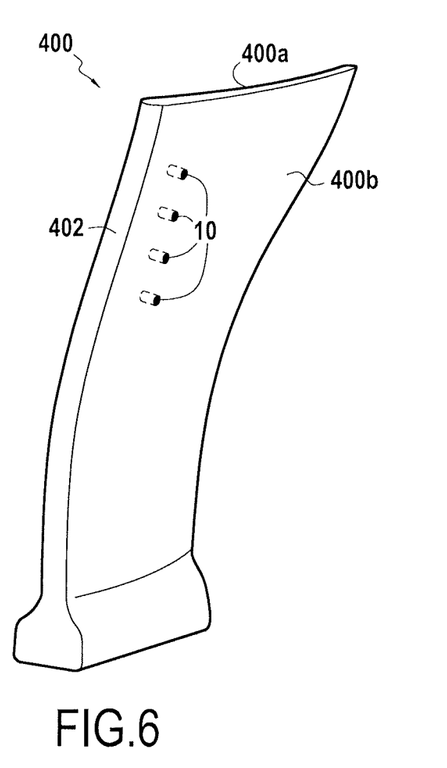
FIG. 6 is a diagrammatic perspective view of the turbine engine blade made of composite material as obtained after the operation of FIG. 5.
Figure 7:
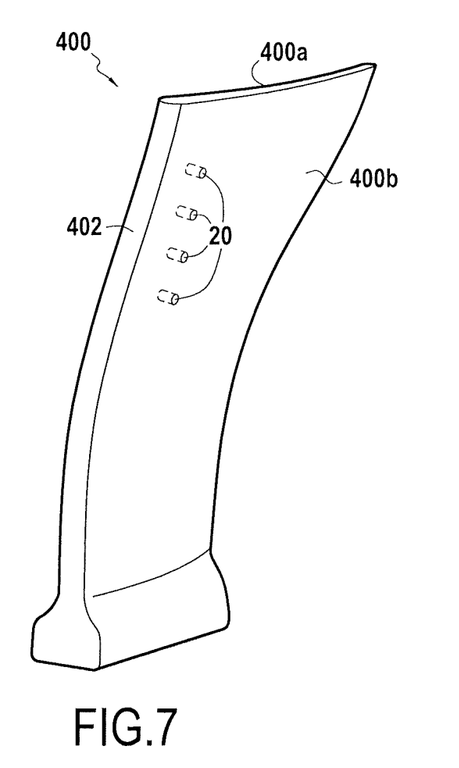
FIG. 7 is a diagrammatic perspective view of the FIG. 6 turbine engine blade made of composite material after eliminating the inserts.

As shown in FIG. 6, a blade 400 is obtained that is made of fiber reinforcement densified with a matrix, except at the inserts 10. The inserts 10 are then removed in order to open the passages for fastening metal reinforcement on the composite material blade. The inserts may in particular be removed mechanically, e.g. by machining. The inserts are preferably made of a material that adheres little or not at all to the resin once it has polymerized. The inserts may be made in particular out of any of the following materials: metal, polytetrafluoroethylene, and polyamide.

Figure 8A:
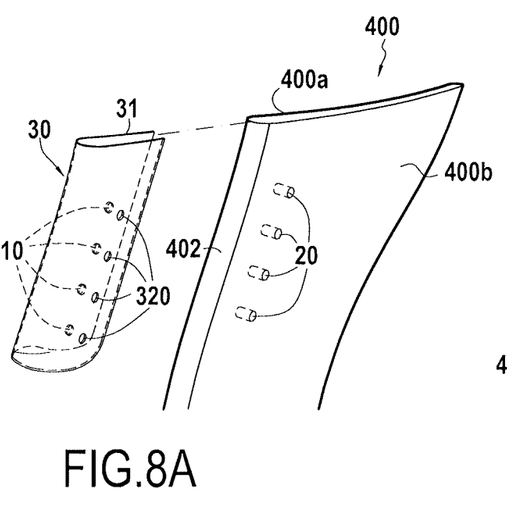
FIGS. 8A and 8B are diagrammatic perspective views showing metal reinforcement being fastened on the FIG. 7 blade.
Figure 8B:
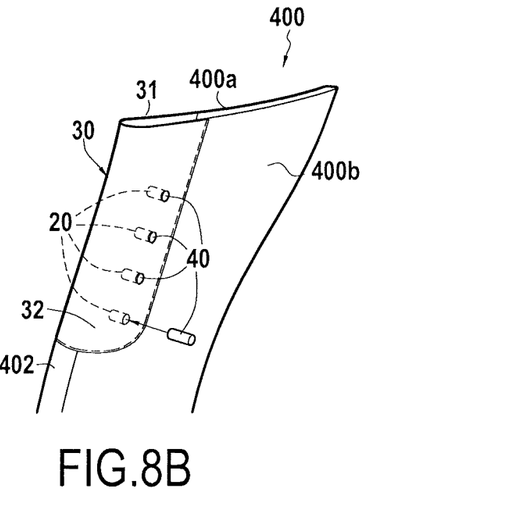

Once the inserts 10 have been eliminated, the composite material blade 400 presents passages 20 extending through the thickness of the blade and opening out both into the pressure side face 400a and the suction side face 400b of the blade 400, as shown in FIG. 8A. In the presently-described example, the composite material blade 400 is reinforced at its leading edge 402. For this purpose, the passages 20 are formed in a zone that is close to the leading edge 402 so as to enable shaped metal reinforcement 30 to be fastened by riveting, the shape of the reinforcement corresponding to the shape of the portion of the blade on which it is to be fastened (FIG. 8A). More precisely, the metal reinforcement 30 has first and second portions 31 and 32 that are to be fastened respectively on the pressure side face 400a and on the suction side face 400b of the blade. The first portion 31 has orifices 310 in positions that are defined so that they coincide with the passages 20 in the pressure side 400a of the blade 400. Likewise, the second portion 32 has orifices 320 in positions that are defined so as to coincide with the passages 20 in the suction side 400b of the blade 400. The metal reinforcement 30 is fastened by positioning the reinforcement on the blade so as to bring the orifices 310 and 320 into alignment with the passages 20, and by inserting a rivet 40 into each passage 20, as shown in FIG. 8B. A composite material blade 400 is thus obtained that includes metal reinforcement 30 fastened thereto by rivets, without any of the yarns of the fiber reinforcement being broken level with the housings in which the rivets 40 are placed.

There follows a description of another method of fabricating a composite material blade with metal reinforcement fastened thereto, which method differs from the above-described method in that the passages for the rivets are reserved in the fiber texture while it is being shaped in tooling. More precisely, a fiber structure 500 (FIG. 9) is initially made that is suitable, after compacting and shaping, for obtaining a fiber reinforcing preform for an aeroengine blade. The fiber structure is made from a fiber blank obtained by three-dimensional (3D) weaving or by multilayer weaving, like the above-described fiber blank 100.

Figure 9:
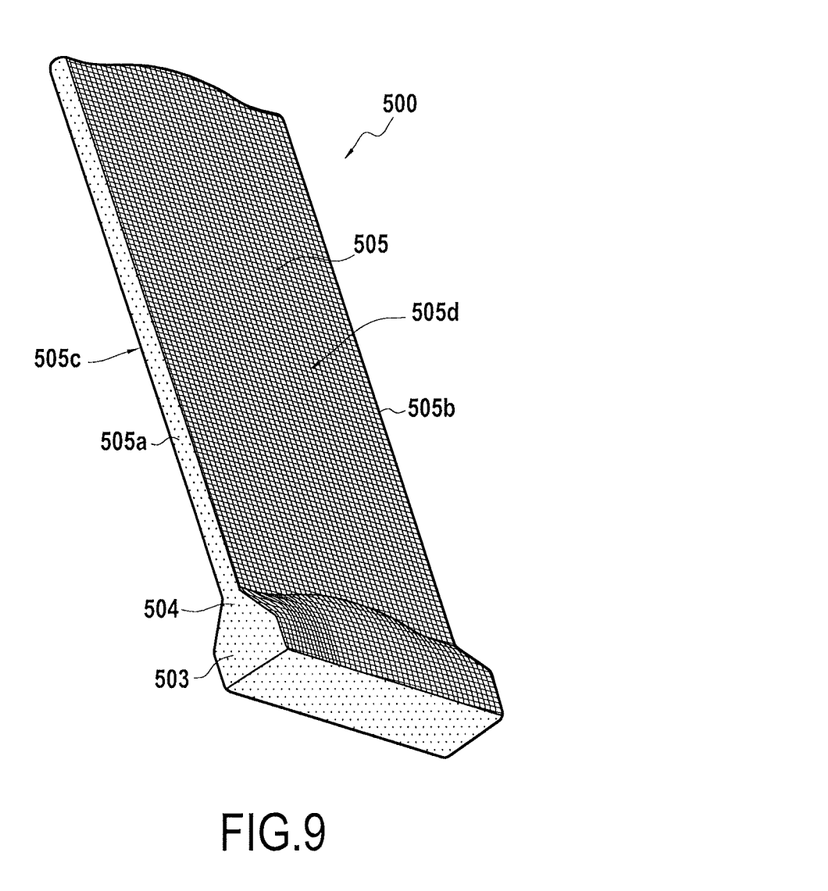
FIG. 9 is a diagrammatic view of a fiber structure in accordance with another embodiment of the invention.

The fiber structure 500 presents varying thickness including a portion 503 of greater thickness that is to form a root preform, which extra thickness is determined as a function of the thickness of the root of the blade that is to be made. The fiber structure 500 is extended by a portion 504 of decreasing thickness that is to form the tang of the blade, followed by a portion 505 that is to form the airfoil of the blade. In a direction perpendicular to the direction X, the portion 505 presents a profile of varying thickness between its edge 505a that is to form the leading edge of the blade and its edge 505b that is to form the trailing edge of the blade that is to be made. The portion 505 has first and second faces 505c and 505d extending between the edges 505a and 505b in order to form the pressure side face and the suction side face, or vice versa, of the blade airfoil. The fiber structure 500 is woven as a single piece.

Figure 10:
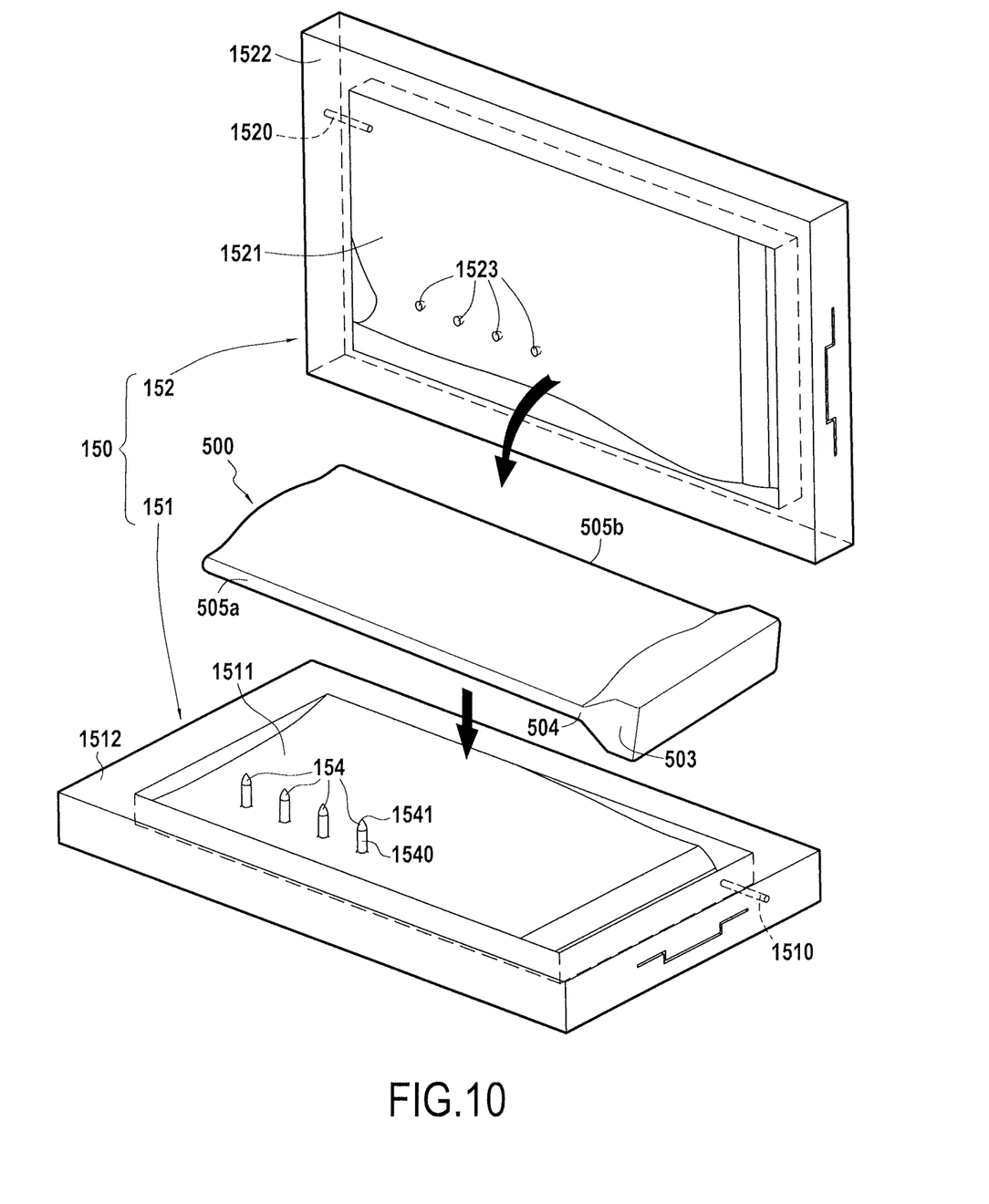
FIG. 10 is an exploded diagrammatic perspective view showing shaping tooling in accordance with another embodiment of the invention and showing how the fiber structure of FIG. 9 is placed therein.

The following step consists in compacting and shaping the fiber structure 500 in order to form a fiber preform ready for densifying. For this purpose, the fiber structure is placed in shaping tooling 150 (FIG. 10). The tooling 150 comprises a first shell 151 having a first cavity 1511 in its center that corresponds to part of the shape and the dimensions of the blade that is to be made, the cavity 1511 being surrounded by a first contact plane 1512. The first shell 151 also includes an injection port 1510 to enable a matrix-precursor liquid composition to be injected into the fiber preform. The tooling 150 also comprises a second shell 152 that includes in its center a second cavity 1521 corresponding in part to the shape and to the dimensions of the blade that is to be made, the second cavity 1521 being surrounded by a second contact plane 1522 that is to co-operate with the first contact plane 1512 of the first shell 151. The second shell also includes a discharge port 1520 for co-operating with a pumping system.

The first and second shells may be made in particular out of a metal material such as aluminum, for example, or else out of graphite.

In an embodiment of the invention, one or more teeth or spikes, specifically a plurality of teeth 154, are present on the first shell 151. More precisely, the cavity 1511 of the first shell 151 has a plurality of teeth 154 extending vertically from the surface 1511a of the cavity 1511 in a zone of the cavity that is close to the zone that is to form the leading edge of the blade. Each tooth 154 comprises a shank 1540 having dimensions similar to the dimensions of the shank of the rivet that is to be inserted in the passage formed in the blade after polymerization. The shank 1540 is preferably extended by a spike 1541 forming the free end of each tooth 154. The spike 1541 makes it easier for the tooth 154 to penetrate into the fiber texture 500 while it is being put into place in the tooling 150. The cavity 1521 of the second shell 152 includes orifices 1523 that are to co-operate with the teeth 154 present on the surface of the cavity 1511 of the first shell 151 after the tooling 150 has been closed. The orifices 1523 are for receiving the spikes 1541 of the teeth 154, as shown in FIG. 11B.

The fiber structure 500 is initially positioned in the cavity 1511 of the first shell 151, the second shell 152 then being placed on the first shell 151 so as to close the shaping tooling 150. Each tooth 154 then passes through the portion 505 in its thickness direction, i.e. from the face 505c to the face 505d. This creates an empty passage between the fibers that can be maintained until the end of fabricating the composite material blade, i.e. until after the fiber preform has been densified as explained above. The passage(s) are also reserved in this way without breaking fibers of the warp or weft yarns.

Figure 11A:
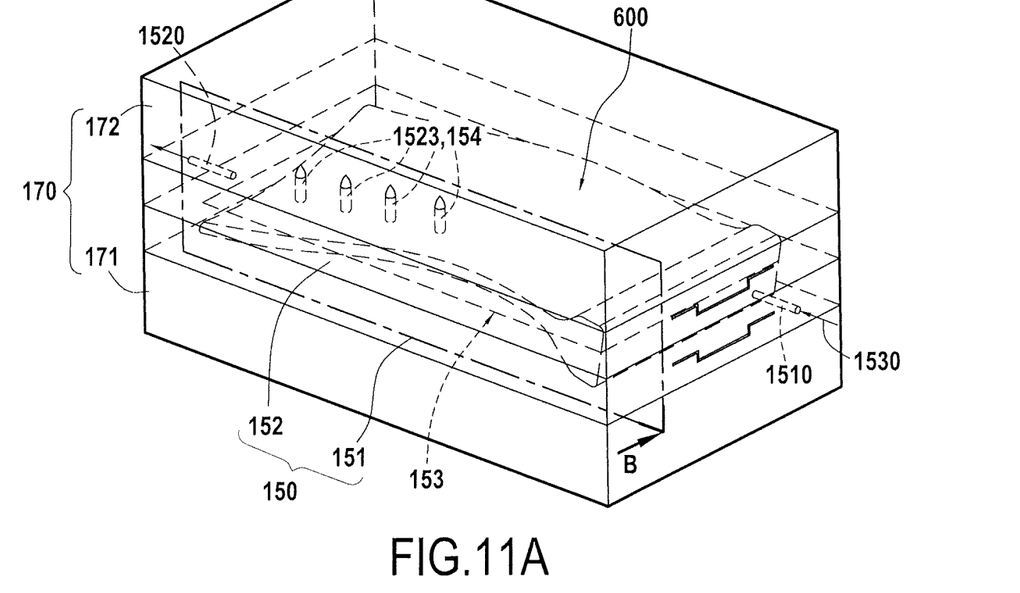
FIGS. 11A and 11B are diagrammatic views respectively in perspective and in axial section showing how the FIG. 10 shaping tooling is placed in injection tooling and how an operation of injecting a matrix-precursor liquid composition into the fiber preform is performed in order to obtain a composite material blade.
Figure 11B:
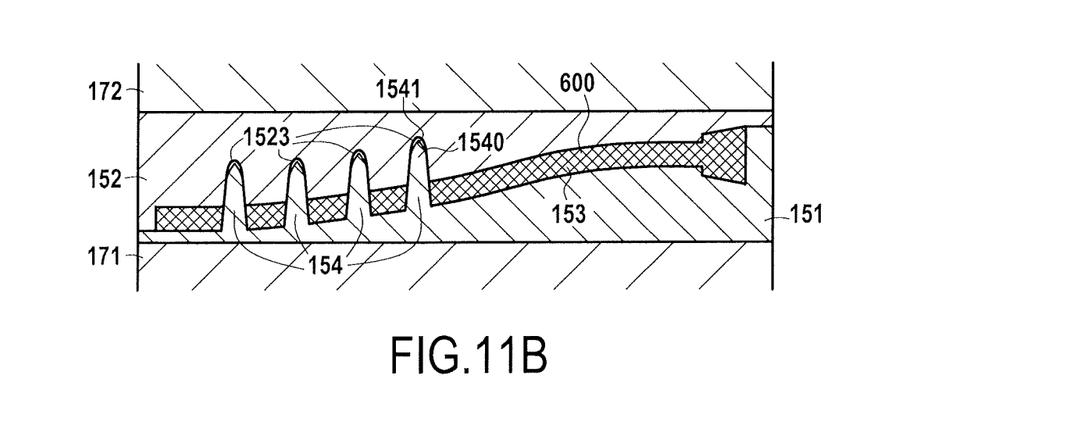

Once the tooling 150 has been closed, as shown in FIGS. 11A and 11B, the first and second shells are in an "assembly" position, i.e. a position in which the first and second cavities 1511 and 1521 are placed facing each other, with the first and second contact planes 1512 and 1522 likewise facing each other. In this configuration, the first and second cavities 1511 and 1521 together define an inside volume 153 having the shape of the blade that is to be made and in which the fiber structure 500 is placed. The teeth 154 are present across the thickness of the fiber texture, thereby reserving passages for rivets after polymerization.

In the presently-described example, the cavity 1511 is for forming the pressure side of the blade fiber preform while the cavity 1521 is for forming the suction side of the blade preform.

As described above for the fiber texture 200, the tooling 150 with the fiber structure 500 inside it is placed in compacting and shaping tooling (not shown in FIGS. 11A and 11B), which is subjected to the application of compacting pressure, e.g. applied by placing the tooling in a press. Applying pressure causes the first and second shells to move towards each other until the first and second contact planes meet, thereby serving both to compact the fiber structure with a determined compaction ratio in order to obtain a likewise determined fiber density, and also to shape the fiber structure to match the profile of the blade that is to be fabricated. A preform 600 is then obtained that presents the shape of the blade that is to be made.

In FIGS. 11A and 11B, the tooling 150 is placed between a bottom portion 171 and a top portion 172 of injection tooling 170. The bottom portion 171 and the top portion 172 of the tooling 170 are provided with heater means (not shown in FIGS. 11A and 11B). Once the tooling 170 is closed, the blade is then molded by impregnating the preform 600 with a thermosetting resin that is polymerized by heat treatment. For this purpose, use is made of the well-known resin transfer molding (RTM) method. In accordance with the RTM method, a resin 1530, e.g. a thermosetting resin, is injected via the injection port 1510 of the first shell 151 into the inside space 153 defined between the two cavities 1511 and 1521 and occupied by the preform 600. The port 1520 in the second shell 152 is connected to a discharge duct that is maintained under pressure (not shown in FIG. 11A). This configuration enables a pressure gradient to be set up between the bottom portion of the preform 600 into which the resin is injected and the top portion of the preform situated in the proximity of the port 1520. In this way, the resin 1530 injected substantially into the bottom portion of the preform progressively impregnates all of the preform by flowing through it to the discharge port 1520 through which surplus resin is evacuated. Naturally, the first and second shells 151 and 152 of the tooling 150 may respectively include a plurality of injection ports and a plurality of discharge ports.

By way of example, the resin used may be an epoxy resin of temperature class 180° C. (the maximum temperature it can withstand without losing characteristics). Resins suitable for RTM methods are well known. They preferably present low viscosity in order to facilitate injecting them into the fibers. The choice of the temperature class and/or of the chemical nature for the resin is determined as a function of the thermomechanical stresses to which the part is to be subjected. Once resin has been injected throughout the reinforcement, it is polymerized by heat treatment in accordance with the RTM method.

After injection and polymerization, the blade is unmolded. It may optionally be subjected to a post-baking cycle in order to improve its thermomechanical characteristics (increasing its glass transition temperature). Finally, the blade is trimmed in order to remove excess resin and chamfers are machined. No other machining is needed, since the part is molded, it complies with the required dimensions.

Figure 12:
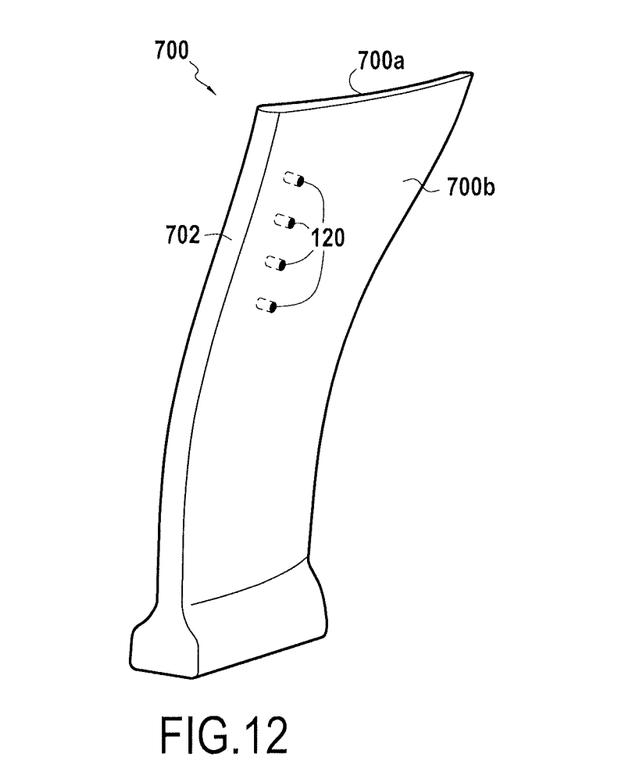
FIG. 12 is a diagrammatic perspective view of the composite material turbine engine blade obtained after the operation of FIG. 11A.
Figure 13A:
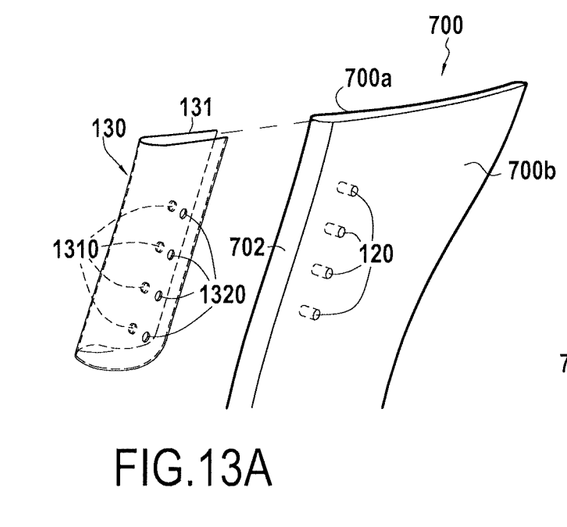
FIGS. 13A and 13B are diagrammatic perspective views showing how metal reinforcement is fastened on the FIG. 12 blade.
Figure 13B:
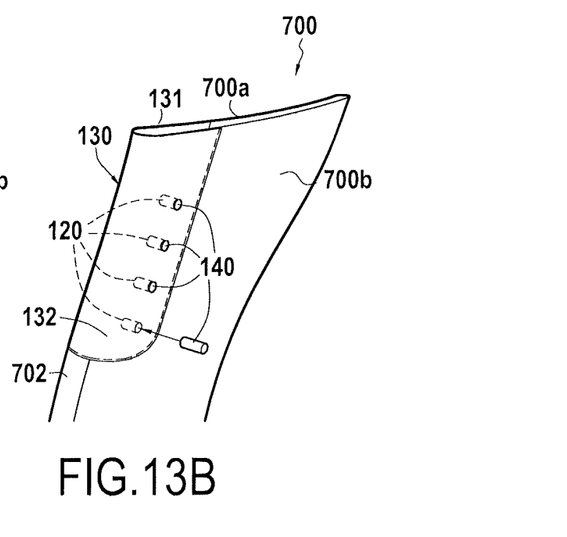

As shown in FIG. 12, a blade 700 is obtained that is formed by fiber reinforcement densified with a matrix, the composite material blade 700 also presenting passages 120 corresponding to the locations of the teeth 154. The passages 120 extend through the thickness of the blade and they open out both into the pressure side face 700a and the suction side face 700b of the blade 700. In the presently-described example, the composite material blade 700 is reinforced at its leading edge 702. For this purpose, the passages 120 are formed in a zone close to the leading edge 702 so as to enable shaped metal reinforcement 130 to be fastened by rivets, the shape of the reinforcement corresponding to the portion of the blade on which it is to be fastened (FIG. 13A). More precisely, the metal reinforcement 130 has first and second portions 131 and 132 that are to be fastened respectively on the pressure and suction side faces 700a and 700b of the blade. The first portion 131 has orifices 1310 of positions that are defined to coincide with the passages 120 in the pressure side 700a of the blade 700. Likewise, the second portion 132 has orifices 1320 of positions that are defined to coincide with the passages 120 in the suction side 700b of the blade 700. The metal reinforcement 130 is fastened by placing the reinforcement on the blade so as to bring the orifices 1310 and 1320 into alignment with the passages 120, and by inserting a rivet 140 into each passage 120, as shown in FIG. 13B. This produces a composite material blade 700 having metal reinforcement 130 fastened thereon by rivets, with none of the yarns of the fiber reinforcement of the blade being broken at the housings in which the rivets 140 are placed.

In a variant implementation of the method, the above-described fiber preforms 300 and 600 are already impregnated with a resin before they are inserted into the shaping tooling, e.g. by weaving the fiber textures 200 and 500 from yarns that are preimpregnated with resin or by impregnating the fiber textures 200 and 500 with resin after weaving. Under such circumstances, there is no need to inject resin into the shaping tooling prior to polymerizing the resin.

The invention finds an application in fabricating turbine engine airfoil elements such as blades, and in particular fan blades for aviation.

The invention claimed is:

1. A method of fabricating an airfoil element out of composite material, the method comprising:
    making a fiber preform, said preform being impregnated with resin;
    polymerizing the resin with a matrix so as to obtain an airfoil element made of composite material comprising fiber reinforcement densified by a matrix; and
    fastening metal reinforcement on the composite material airfoil element, the metal reinforcement being fastened on the airfoil element by rivets;
    wherein the method further comprises, prior to impregnating the fiber preform with resin, inserting at least one spacer element between the fibers of the fiber preform and removing said at least one spacer element after the resin has been polymerized so as to form at least one passage between the fibers of the fiber reinforcement of the composite material airfoil element, and
    wherein the method further comprises impregnating the fiber preform with the resin by injecting the resin into the fiber preform when the at least one spacer element is inserted between the fibers of the fiber preform.

2. The method according to claim 1, wherein the at least one spacer includes at least one insert corresponding to the dimensions of a passage for the shank of a rivet is inserted between the fibers of the fiber preform, the insert being removed or eliminated after the resin has been polymerized in order to form a passage suitable for receiving the shank of a rivet in the composite material airfoil element.

3. The method according to claim 2, wherein each insert is removed from the composite material airfoil element by mechanical means.

4. The method according to claim 2, wherein the at least one insert is removed from the airfoil element by machining the at least one insert.

5. The method according to claim 2, further comprising, after the polymerizing the resin and prior to the fastening the metal reinforcement, removing the airfoil element from a mold in which the polymerizing takes place, and then removing the at least one insert from the airfoil element.

6. The method according to claim 1, wherein, prior to polymerizing the resin, a fiber texture that is to form the fiber preform is placed in the mold cavity of shaping tooling, said cavity including the at least one spacer, the at least one spacer including at least one tooth or spike serving to form at least one passage between the yarns of the fiber texture, the resulting fiber preform being maintained in the mold cavity during polymerization of the resin.

7. The method according to claim 1, wherein the fiber preform is obtained from a fiber texture made by three-dimensional or multilayer weaving, the preform subsequently being impregnated with a resin.

8. The method according to claim 1, wherein the airfoil element corresponds to a turbine engine blade.

9. The method according to claim 8, wherein the turbine engine blade is an aeroengine fan blade.

10. The method according to claim 1, wherein the polymerizing the resin includes heating the resin.

11. The method according to claim 1, wherein the resin is a thermosetting resin and the polymerizing includes heating the thermosetting resin.

12. A method of fabricating an airfoil element out of composite material, the method comprising:

making a fiber preform, said preform being impregnated with resin;

polymerizing the resin with a matrix so as to obtain an airfoil element made of composite material comprising fiber reinforcement densified by a matrix; and fastening metal reinforcement on the composite material airfoil element, the metal reinforcement being fastened on the airfoil element by rivets;

wherein the method further comprises, prior to impregnating the fiber preform with resin, inserting at least one spacer element between the fibers of the fiber preform and removing said at least one spacer element after the resin has been polymerized so as to form at least one passage between the fibers of the fiber reinforcement of the composite material airfoil element, wherein the at least one spacer includes at least one insert corresponding to the dimensions of a passage for the shank of a rivet is inserted between the fibers of the fiber preform, the insert being removed or eliminated after the resin has been polymerized in order to form a passage suitable for receiving the shank of a rivet in the composite material airfoil element, and wherein the at least one insert is removed from the airfoil element by machining the at least one insert.

13. A method of fabricating an airfoil element out of composite material, the method comprising:

making a fiber preform, said preform being impregnated with resin;

polymerizing the resin with a matrix so as to obtain an airfoil element made of composite material comprising fiber reinforcement densified by a matrix; and fastening metal reinforcement on the composite material airfoil element, the metal reinforcement being fastened on the airfoil element by rivets;

wherein the method further comprises, prior to impregnating the fiber preform with resin, inserting at least one spacer element between the fibers of the fiber preform and removing said at least one spacer element after the resin has been polymerized so as to form at least one passage between the fibers of the fiber reinforcement of the composite material airfoil element, wherein the at least one spacer includes at least one insert corresponding to the dimensions of a passage for the shank of a rivet is inserted between the fibers of the fiber preform, the insert being removed or eliminated after the resin has been polymerized in order to form a passage suitable for receiving the shank of a rivet in the composite material airfoil element, and where the method further comprising, after the polymerizing the resin and prior to the fastening the metal reinforcement, removing the airfoil element from a mold in which the polymerizing takes place, and then removing the at least one insert from the airfoil element.

* * * * *